United States Patent

Lee

[11] 4,313,131
[45] Jan. 26, 1982

[54] CCD COMB FILTER AND DEMODULATOR
[75] Inventor: Ronald B. Lee, Skokie, Ill.
[73] Assignee: Zenith Radio Corporation, Glenview, Ill.
[21] Appl. No.: 185,115
[22] Filed: Sep. 8, 1980
[51] Int. Cl.³ .......................................... H04N 9/535
[52] U.S. Cl. ...................................... 358/31; 358/23
[58] Field of Search ................. 358/23, 31, 36, 39, 358/40

[56] References Cited

U.S. PATENT DOCUMENTS

| | | | |
|---|---|---|---|
| 4,096,516 | 6/1978 | Pritchard | 358/31 |
| 4,158,209 | 6/1979 | Levine | 358/31 |
| 4,205,335 | 5/1980 | Nakagawa | 358/31 |
| 4,224,638 | 9/1980 | Pritchard | 358/31 |

OTHER PUBLICATIONS

A Practical Charge-Coupled Device Filter for the Separation of Luminance and Chrominance Signals in a Television Receiver, Barton, IEEE Trans on Consumer Electronics, vol. CE-23, No. 3, Aug. 1977, pp. 342-357.

*Primary Examiner*—Michael A. Masinick
*Attorney, Agent, or Firm*—Jack Kail; John H. Moore

[57] ABSTRACT

A color demodulation and comb filtering system is described for use in a color television receiver. The system includes a pair of charge coupled devices (CCD's) which each receive a filtered video signal and which develop outputs which are delayed, one from the other, by one horizontal line interval. Both devices are clocked at the color subcarrier frequency to develop outputs which include demodulated color and luminance components. The outputs of the two CCD's are combined in a summer, the output of which includes demodulated color components from which luminance components are eliminated.

9 Claims, 4 Drawing Figures

CCD COMB FILTER AND DEMODULATOR

BACKGROUND OF THE INVENTION

This invention relates generally to improvements in color television receivers. It is particularly directed to systems which comb-filter luminance components from color components of a television signal.

In NTSC type broadcast signals, luminance and color components are frequency-interleaved. At the receiver, those components are separated from each other and processed separately to develop a video image.

To effect the required separation between the luminance and color components, various well known types of filters may be employed. One such filter is known as a comb filter in which the combined video signal is processed along two parallel paths, one path having an 1-H (one horizontal line interval) delay greater than the delay associated with the other path. The signals which are output from each path are combined so that color components are separated from luminance components. For good performance, the delay and gain associated with each path must be stable and accurate.

Since the commercial arrival of CCD's (charge coupled devices) it has been proposed to use CCD's for constructing comb filter delay elements. One CCD provides the delay associated with one processing path, and another, shorter CCD provides the delay associated with the other path. U.S. Pat. No. 4,096,516 describes such a CCD comb filter.

In the system described in the above-mentioned patent, the CCD delay lines are clocked at a frequency of three times the color subcarrier frequency, and an inverter is included in one delay path for proper combing operation. It is thought that the need for such an inverter can contribute to a difference in the required 1-H delay between the two paths and also contribute to an undesired difference in gain between paths. Hence, some kind of gain adjustment and/or delay adjustment is thought to be necessary for satisfactory commercial implementation of this system. In addition, the above-mentioned CCD comb filter system requires, of course, one or more color demodulators for developing baseband color signals from the separated color components.

For application of CCD comb filters to high volume commercial television receivers, it is preferable that no adjustment be required of the gain or delays associated with the filter. In addition, power can be saved if the frequency of the CCD's clock input is lowered. A further, and very significant, improvement in such comb filters could be realized if the CCD's which are employed as a comb filter were also capable of operating as a color demodulator.

OBJECTS OF THE INVENTION

It is a general object of the invention to provide an improved CCD comb filter for color television applications.

It is a more specific object of the invention to provide a CCD comb filter which not only separates luminance components from color components, but which also demodulates the color components.

It is a further object of the invention to provide such a comb filter which operates at a relatively low clock frequency, which requires no delay or gain adjustment, and which does not require an inverter for proper operation.

BRIEF DESCRIPTION OF THE FIGURES

The objects stated above and other objects of the invention are more particularly set forth in the following detailed description and in the accompanying drawings, of which.

DESCRIPTION OF THE PREFERRED EMBODIMENT

Figure 1:
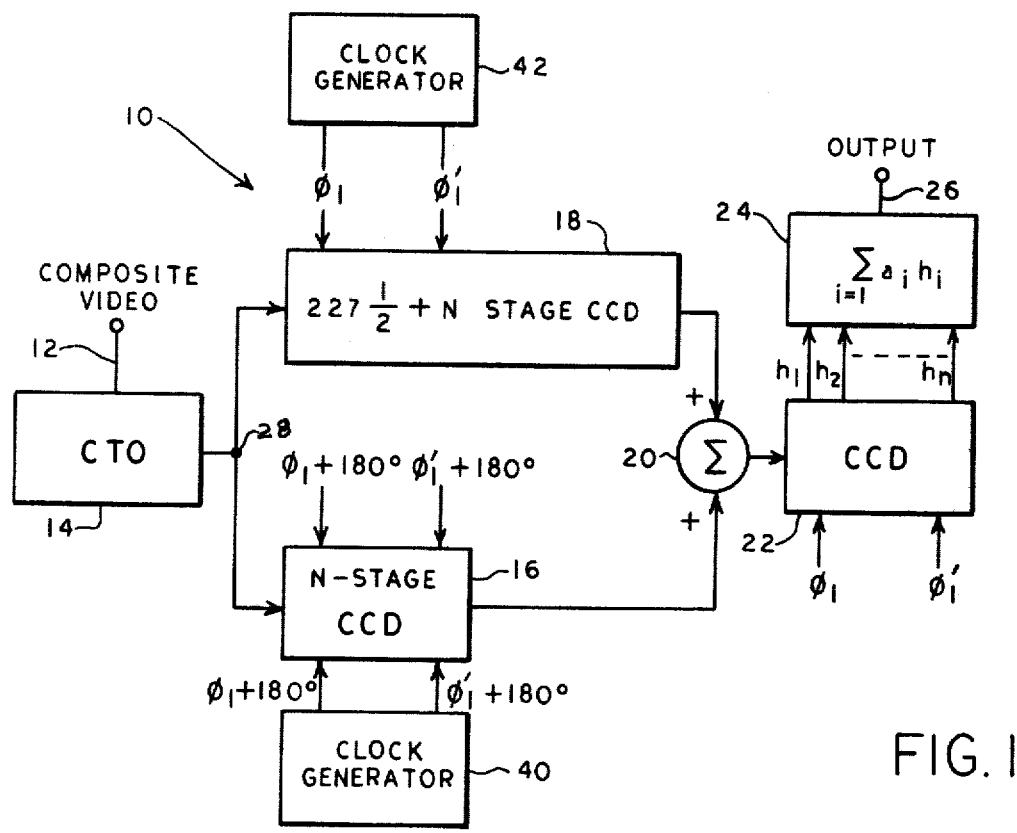
FIG. 1 illustrates a comb filter and color demodulation system in accordance with the invention.

Referring to FIG. 1, a system 10 is shown for simultaneously effecting comb filtering and color demodulation in accordance with the invention. The input to the illustrated system is at a lead 12 where composite video, including luminance and color components, is received. Conventionally, the color information in the video signal is modulated on a subcarrier whose frequency is approximately 3.58 megahertz, and the frequency of the luminance components extends from D.C. to about 4.2 megahertz. As is customary with NTSC type broadcast signals, the luminance components of the composite video signal are frequency-interleaved with the color components.

In order to separate the luminance components from the color components, and to simultaneously demodulate the color components, the illustrated system includes a color take off (CTO) network 14, a first signal processing path which includes a CCD device 16, a second signal processing path which includes a CCD device 18, and means in the form of a summer 20 for combining the outputs of CCD devices 16 and 18. As explained in more detail below, the output of the summer 20 includes demodulated color components at their baseband frequencies in addition to color components whose frequencies are multiples of the subcarrier frequency (3.58 megahertz). The output of the summer 20 is coupled to elements 22 and 24 which operate together as a transversal filter to shape the chroma passband.

Referring again to the CTO network 14, it may be constructed of conventional discrete capacitors and coils for attenuating low frequency (zero to about 1.3 megahertz) luminance and for passing higher frequency color and luminance components to a node 28. Preferably, the CTO network attenuates low frequency luminance components by at least 30 d.b. (decibels) so that the remainder of the system operates satisfactorily. In addition, the CTO network preferably has a frequency response which compensates for the frequency response of an IF amplifier from which the video input signal is derived. Because IF amplifiers generally provide less amplification of color components above 3.58 megahertz than they do for color components below 3.58 megahertz, the CTO network will usually be selected to have the reverse frequency response.

Figure 3:
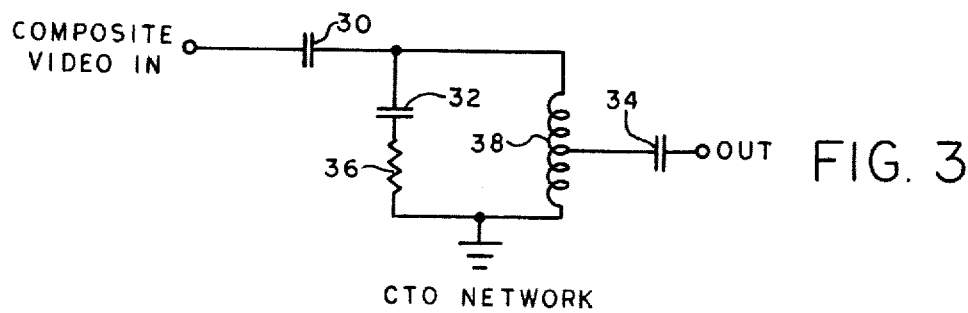
FIG. 3 is a circuit diagram of the color take off network of FIG. 1.

Referring briefly to FIG. 3, there is shown an embodiment of a CTO network which provides the functions described above. The network includes capacitors 30, 32 and 34, a resistor 36, and a tapped coil 38, all interconnected as shown. The values of the network's components may be selected to provide the type of frequency response desired in addition to suppression of low frequency luminance components.

Referring again to FIG. 1, the CCD device 16 is included primarily for converting the signal voltage at the node 28 to corresponding packets of charge for application to the summer 20. For this purpose, the device 16 includes N CCD stages, where N may be equal to 1, 5, 10, or any number of stages. The more stages which are included, the greater will be the delay associated with device 16. However, the actual delay associated with device 16 is not critical, as long as that delay is matched by a corresponding additional delay in the CCD device 18.

As shown, the delay device 16 may be a two phase type charge transfer device which receives a pair of clock signals from a conventional clock generator 40. The phases and frequency of those clock signals are discussed below.

The second CCD device 18 is similar to the CCD device 16 except that the former includes a sufficient number of stages to delay its input signal from node 28 by an interval equal to 1-H, plus the delay associated with the CCD device 16. In this embodiment, the CCD device 18 includes 227½ stages plus the N stages associated with the element 16. Thus, if the device 16 includes 2 stages, the device 18 will include 229½ stages. In this manner, the difference in delay between devices 16 and 18 is 227½ stages. Because of the clock frequency selected, those 227½ stages constitute a 1-H difference in delay.

Figure 2:
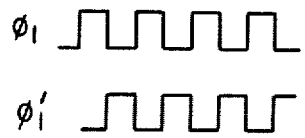
FIG. 2 depicts a pair of clock signal waveforms used in the system of FIG. 1.

To clock the device 18, another clock generator 42 is included to provide clock signals identified as $\phi_1$ and $\phi_1'$. The clock signal $\phi_1$ is selected to have a frequency equal to the color subcarrier frequency of 3.58 megahertz. The clock signal $\phi_1'$ is also selected to have a frequency equal to the color subcarrier frequency and is selected to have a phase which is offset from the phase of $\phi_1$ by 180°, as shown in FIG. 2. Transition rates of the clock signals $\phi_1$ and $\phi_1'$ may be adjusted for optimal CCD operation as is customary with CCD's.

Clocking the device 18 as shown is equivalent, in the time domain, to multiplying the input to the device 18 by a signal S(t), where S(t) is defined in the following equation:

$$S(t) = 1 + a_1 \cos W_c t + a_2 \cos 2W_c t + a_3 \cos 3W_c t + \ldots$$

where $W_c = 2\pi X$ the frequency of the color subcarrier. Consequently, the output of the device 18 includes baseband color and luminance components and higher frequency components centered about multiples of the color subcarrier frequency. The latter high frequency components may be filtered out by conventional filters coupled to the output terminal 26.

Because of the D.C. term (1) in the equation above, it is necessary to assure that there are no frequency components in the signal input to the device 18 (and to the device 16) which will be mixed with the demodulated baseband color components at its output. The low frequency attenuation provided by the CTO network 14 serves this purpose. In other words, removal of the low frequency luminance components assures that the operation performed on the input to the device 18 does not result in overlapping frequency spectra. Such overlap results in what is referred to as "aliasing" and is undesirable because, in the present application, it would provide a distortion in the demodulated baseband color components. In the present embodiment, no substantial aliasing occurs.

Referring again to the CCD device 16, the latter device receives a first clock signal identified as $\phi_1 + 180°$. Thus, the clock signal $\phi_1$ applied to the device 18 need merely be offset in phase by 180° and applied to the device 16. The other clock input to the device 16 is identified as $\phi_1' + 180°$. It may be developed merely by offsetting the phase of the clock signal $\phi_1'$. Because all clock inputs to the devices 16 and 18 are of the same frequency and have related phases, they may be developed by a single clock generator rather than the two illustrated generators 40 and 42.

In operation, the device 16 operates in the manner previously described for the device 18. That is, the output of the device 16 includes baseband color and luminance components and higher frequency components centered about multiples of the color subcarrier frequency.

To remove the luminance components from the demodulated signal, the outputs of the devices 16 and 18 are coupled to the summer 20. Because of the 1-H delay difference provided by devices 16 and 18, the summer 20 provides at its output a resultant signal from which baseband and higher frequency luminance components are eliminated. Only demodulated baseband color components and color components whose frequencies are multiples of the color subcarrier are present in the output of the summer 20. This effect is achieved as a result of the frequency of the clock signals and their relative phases as described above.

It can be seen, therefore, that the combination of the CTO network 20, the CCD devices 16 and 18, the color subcarrier clock inputs, and the summer 20 provides both a comb filter for removing luminance components and a color demodulator. The higher frequency components at the output of the summer 20 may be suppressed by a low pass filter coupled to the output of the element 24.

Among the advantages of the present system is the fact that no adjustment is needed to compensate for delay variations or gain variations between the two processing paths, primarily because the system does not employ an inverter in either path. In addition, the clock frequency is low, thereby reducing the power consumption of the system. Moreover, the comb filtering is less complex than other CCD type filters because the filtering is done at baseband frequencies. Of course, the CCD devices themselves are less complex because they use fewer stages than are usually required to separate color components from luminance components.

The construction of the CTO network has already been discussed. As for the CCD stages 16 and 18 and the summer 20, all may be of the type disclosed in U.S. Pat. No. 4,096,516.

Referring again to the elements 22 and 24, the former is a CCD type device constructed to function as a tapped delay line for developing outputs $h_1$ through $h_n$. The latter outputs are received by the device 24, weighted, and summed together to provide at the output lead 26 a signal which includes demodulated baseband color components. The output of the device 24 may be filtered to remove undesired clock and high frequency components, and then coupled to further signal processing circuitry and to a cathode ray tube for developing color images in the conventional manner.

As stated previously, the elements 22 and 24 operate together as a transversal filter. Such a filter may be constructed as described in an article entitled "Double-Split-Electrode Transversal Filter for Telecommunication Applications", appearing in the February, 1979 issue of the IEEE Journal of Solid State Circuits (Vol. S.C.-14, No. 1). Such a filter is also described in an article entitled "A 500-Stage CCD Transversal Filter for Spectral Analysis", appearing in the February, 1976 issue of the same journal.

Figure 4:
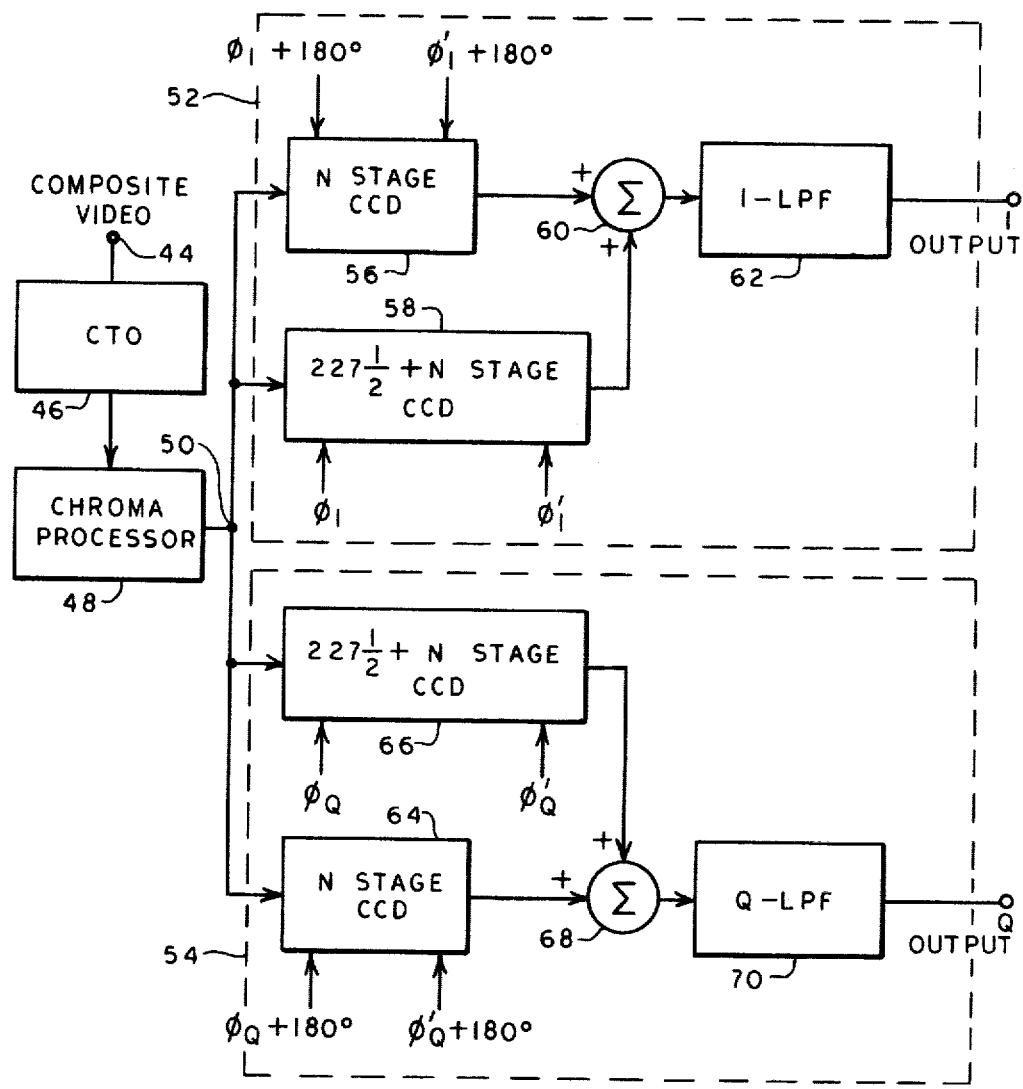
FIG. 4 shows a pair of comb filters and demodulators, of the type illustrated in FIG. 1, for developing a pair of color-difference signals for use in a color television receiver.

As those skilled in the television art are aware, color television receivers typically include at least two color demodulators for developing a pair of baseband color signals. For purposes of generality, these baseband color signals may be referred to as I and Q signals. The system of FIG. 1 may be employed to generate such I and Q signals in the manner depicted in FIG. 4.

As shown in the latter figure, the illustrated system receives a composite video signal at an input terminal 44. A color take off network 46, which may be similar to the network shown in FIG. 3, filters low frequency components from the input video signal and applies the filtered signal to a chroma processor 48. Conventional signal processing, such as automatic color level control and the like, may be effected by the processor 48.

The processed and filtered video signal is coupled to a node 50, from which the video signal is applied to an "I" demodulator 52 and a "Q" demodulator 54. Both demodulators operate in the manner described above with respect to FIG. 1. Specifically, the I demodulator 52 includes an N stage CCD device 56, a 227½ plus N stage CCD device 58, a summer 60, and a low pass filter 62. The CCD device 58 is clocked by signals $\phi_I$ and $\phi_I'$ whose frequencies are equal to the frequency of the color subcarrier. Their phases are separated from each other by 180 degrees and are selected such that demodulation of the color information occurs along the "I" demodulation axis (or along any other desired axis).

The CCD device 56 is clocked by signals $\phi_I + 180°$ and $\phi_I' + 180°$ so that the inputs to the summer 60 constitute baseband color and luminance components and higher frequency components. As described above, the summer 60 operates to eliminate the luminance components so that only baseband and higher frequency color components appear at its output. An I low pass filter 62, which may be a split-electrode transversal filter, receives the output of the summer 60 to provide the proper pass band for the baseband color components. Higher frequency clock and color components may be removed by coupling the output of the filter 62 to a conventional low pass reconstruction filter.

The demodulator 54 includes an N stage CCD device 64, a 227½ + N stage CCD device 66, a summer 68 and a low pass filter 70. All the components in the demodulator 54 may be the same as corresponding components in the demodulator 52, except that the clock signals $\phi_Q$ and $\phi_Q'$ are selected to demodulate the color components along the Q axis to develop a baseband Q output. The I and Q outputs developed by the demodulators may be amplified as needed for application to the control electrodes of a cathode ray tube (not shown).

As described previously with reference to FIG. 1, the frequency and phases of the clock signals applied to the devices 16 and 18 are such that no luminance components are output by the summer 20. In addition, all components which are developed at the output of the summer 20 have a sampling rate of 1C (one times the color subcarrier frequency).

According to another aspect of the invention, the phases of the clock signals applied to the devices 16 and 18 may be selected such that the output of the summer 20 includes no baseband luminance components but does include higher frequency luminance components centered around odd multiples of the clock frequency. This may be effected by clocking the device 16 with the same clock signals ($\phi_1$ and $\phi_1'$) which are applied to the device 18 such that the devices 16 and 18 each sample the signal at node 28 on the same phase. The effect thus obtained is that the output of the device 16 includes a group of samples occurring at a 1C rate and the output of the device 18 includes another group of samples occurring at a similar rate but interleaved in time with the group of samples from the device 16. Consequently, the summer 20 develops an output signal which appears to have been sampled at a 2C rate (twice the frequency of the color subcarrier). The filters 22 and 24 may now operate at a 2C sample rate to shape the chroma pass band and to remove substantially all components except the color components at baseband and at even multiples of the clock frequency. In this modified embodiment, the summer 20 may be constructed with multiplexed inputs and a common output.

Although the invention has been described in terms of a preferred embodiment, it will be obvious to those skilled in the art that many modifications and alterations may be made without departing from the invention. Accordingly, all such modifications and alterations are deemed to be within the spirit and scope of the invention as defined by the appended claims.

What is claimed is:

1. In a television receiver adapted to process a video signal having luminance components frequency-interleaved with color components modulated on a color subcarrier, a color demodulation and comb filtering system, comprising:
    filter means for receiving the video signal and for filtering low frequency components therefrom;
    a first charge coupled device coupled to the output of said filter means for delaying the signal received therefrom for an interval I and for converting the signal received therefrom to charge packets;
    a second charge coupled device coupled to the output of said filter means for delaying the signal received therefrom for an interval corresponding to the sum of the interval I plus one horizontal line interval, and for converting the signal received therefrom to charge packets;
    means for applying to said first and second charge coupled devices clock signals whose frequencies are equal to the frequency of the color subcarrier such that said first and second charge coupled devices develop output charge packets whose frequency spectra include luminance and color components at their baseband frequencies centered around multiples of the color subcarrier frequency; and
    means for combining the charge packet outputs of said first and second charge coupled devices such that a resultant signal is obtained which includes baseband color components and substantially no baseband luminance components.

2. A system as set forth in claim 1 wherein said combining means includes a charge coupled device adapted to sum the outputs of said first and second charge coupled devices.

3. A system as set forth in claim 1 wherein said first charge coupled device is an N stage device and wherein said second charge coupled device is a 227½ plus N stage device.

4. A system as set forth in claim 1 further including a filter receiving the resultant signal from said combining means for developing a pass band for the color components.

5. A system as set forth in claim 1 wherein the clock signals are phased such that the output of said combining means includes substantially no luminance components at baseband or at higher frequencies.

6. A system as set forth in claim 1 wherein the clock signals are phased such that the output of said combining means includes substantially no baseband luminance components but luminance components which are centered around odd multiples of the clock frequency.

7. In a television receiver adapted to process a video signal having luminance components frequency-interleaved with color components modulated on a color subcarrier, a color demodulation and comb filtering system, comprising:
   filter means for receiving the video signal and for filtering low frequency components therefrom;
   a first N-stage charge coupled device coupled to the output of said filter means for delaying the signal received therefrom for an interval I;
   a second 227½+N stage charge coupled device coupled to the output of said filter means for delaying the signal received therefrom for an interval corresponding to the sum of the interval I plus one horizontal line interval;
   means for applying to said first and second charge coupled devices a clock signal whose frequency is equal to the frequency of the color subcarrier such that said first and second charge coupled devices develop outputs including demodulated color and luminance components; and
   a third charge coupled device coupled to the outputs of said first and second charge coupled devices so as to sum the outputs of the latter devices and to develop a resultant signal which includes demodulated baseband color components but substantially no baseband luminance components.

8. A system as set forth in claim 7 further including a transversal filter receiving the resultant signal from said third charge coupled device for developing a pass band for the color components.

9. In a television receiver adapted to process a video signal having luminance components frequency-interleaved with color components modulated on a color subcarrier, a color demodulation system, comprising:
   filter means for receiving the video signal and for filtering low frequency components therefrom; and
   first and second demodulators each having:
      an N stage charge coupled device and a 227 ½ plus N stage charge coupled device, each of said devices being coupled to the output of said filter means and receiving clock signals whose frequencies are substantially equal to 3.58 megahertz and whose phases are selected to demodulate received color components along one of two demodulation axis;
   means for summing the outputs of both charge coupled devices; and
   a low pass filter coupled to the output of said summing means to provide a selected pass band for the baseband color components.

* * * * *